(12) United States Patent
Ugarte et al.

(10) Patent No.: US 10,036,269 B2
(45) Date of Patent: Jul. 31, 2018

(54) LEAF SEAL REACH OVER SPRING WITH RETENTION MECHANISM

(71) Applicant: General Electric Company, Schenectady, NY (US)

(72) Inventors: Johnnattan Tennessee Ugarte, Mason, OH (US); Darrell Glenn Senile, Oxford, OH (US); Mullahalli Venkataramaniah Srinivas, Mason, OH (US); Jonathon Farmer, Cincinnati, OH (US); Hugh Quill, Kettering, OH (US)

(73) Assignee: General Electric Company, Schenectady, NY (US)

( * ) Notice: Subject to any disclaimer, the term of this patent is extended or adjusted under 35 U.S.C. 154(b) by 422 days.

(21) Appl. No.: 14/920,963

(22) Filed: Oct. 23, 2015

(65) Prior Publication Data
US 2017/0114653 A1 Apr. 27, 2017

(51) Int. Cl.
*F01D 11/00* (2006.01)
*F01D 9/04* (2006.01)
(Continued)

(52) U.S. Cl.
CPC .............. *F01D 11/005* (2013.01); *F01D 9/04* (2013.01); *F01D 11/00* (2013.01); *F01D 11/003* (2013.01);
(Continued)

(58) Field of Classification Search
CPC ...... F01D 11/005; F01D 15/12; F01D 11/003; F01D 11/00; F01D 9/04; F01D 25/246;
(Continued)

(56) References Cited

U.S. PATENT DOCUMENTS

| 4,318,668 A | * | 3/1982 | Chaplin | ................... | F01D 25/14 |
| | | | | | 415/135 |
| 5,078,412 A | * | 1/1992 | Baumgarth | ............. | F02K 1/805 |
| | | | | | 239/127.1 |

(Continued)

FOREIGN PATENT DOCUMENTS

| CN | 1076991 A | 10/1993 |
| CN | 1539050 A | 10/2004 |

(Continued)

OTHER PUBLICATIONS

Extended European Search Report and Opinion issued in connection with corresponding EP Application No. 16194806.2 dated Mar. 3, 2017.

(Continued)

*Primary Examiner* — Eldon Brockman
(74) *Attorney, Agent, or Firm* — General Electric Company; William Andes (57) ABSTRACT

A gas turbine sealing assembly includes a first static gas turbine wall, a second static gas turbine wall, and a leaf seal having a first side and a second side. The first static gas turbine wall contacts the second side at a first position, and the second static gas turbine wall contacts the second side at a second position. A spring exerts force on the first side. The spring includes a first spring wall coupled to the first static gas turbine wall. A second spring wall extends radially outward from the first spring wall. A third spring wall extends axially away from the second spring wall. A fourth spring wall extends radially inward from the third spring wall and includes a radially inner end. The radially inner end of the fourth spring wall contacts the first side of the leaf seal between the first position and the second position.

20 Claims, 6 Drawing Sheets

(51) Int. Cl.
*F01D 15/12* (2006.01)
*F01D 25/24* (2006.01)
*F02C 3/04* (2006.01)
*F02C 7/28* (2006.01)
*F16J 15/08* (2006.01)

(52) U.S. Cl.
CPC ........... *F01D 15/12* (2013.01); *F01D 25/246* (2013.01); *F02C 3/04* (2013.01); *F02C 7/28* (2013.01); *F16J 15/0887* (2013.01); *F05D 2220/32* (2013.01); *F05D 2240/11* (2013.01); *F05D 2240/57* (2013.01); *F05D 2240/80* (2013.01); *F05D 2260/30* (2013.01); *Y02T 50/672* (2013.01)

(58) Field of Classification Search
CPC ..... F02C 7/28; F16J 15/0887; F05D 2260/30; F05D 2240/11; F05D 2240/57; F05D 2240/80
See application file for complete search history.

(56) References Cited

U.S. PATENT DOCUMENTS

| | | | |
|---|---|---|---|
| 5,118,120 A * | 6/1992 | Drerup | F16J 15/021 277/628 |
| 5,265,412 A * | 11/1993 | Bagepalli | F01D 9/023 277/355 |
| 5,797,723 A | 8/1998 | Frost et al. | |
| 6,065,756 A * | 5/2000 | Eignor | F01D 11/005 277/545 |
| 6,402,466 B1 * | 6/2002 | Burdgick | F01D 9/04 277/630 |
| 6,431,555 B1 * | 8/2002 | Schroder | F01D 11/005 277/628 |
| 6,464,457 B1 * | 10/2002 | Morgan | F01D 11/005 277/630 |
| 8,016,297 B2 * | 9/2011 | Heinemann | F01D 11/005 277/644 |
| 8,753,073 B2 * | 6/2014 | Albers | F01D 11/125 415/139 |
| 9,234,433 B2 * | 1/2016 | Helvaci | F01D 11/00 |
| 2009/0243228 A1 * | 10/2009 | Heinemann | F01D 11/005 277/595 |
| 2011/0318171 A1 * | 12/2011 | Albers | F01D 11/125 415/173.1 |
| 2012/0308368 A1 * | 12/2012 | Helvaci | F01D 11/00 415/175 |

FOREIGN PATENT DOCUMENTS

| | | |
|---|---|---|
| EP | 1 156 188 A2 | 11/2001 |
| EP | 2 592 232 A2 | 5/2013 |
| WO | 93/09366 A1 | 5/1993 |

OTHER PUBLICATIONS

First Office Action and Search issued in connection with corresponding CN Application No. 201610918200.4 dated Feb. 6, 2018.

\* cited by examiner

LEAF SEAL REACH OVER SPRING WITH RETENTION MECHANISM

FIELD OF THE INVENTION

The present subject matter relates generally to a sealing assembly for a gas turbine engine. More particularly, the present subject matter relates to a sealing assembly for adjacent stationary components of a gas turbine engine having a spring for securing a leaf seal.

BACKGROUND OF THE INVENTION

A gas turbine engine generally includes, in serial flow order, a compressor section, a combustion section, a turbine section, and an exhaust section. In operation, air enters an inlet of the compressor section where one or more axial compressors progressively compress the air until it reaches the combustion section. Fuel mixes with the compressed air and burns within the combustion section, thereby creating combustion gases. The combustion gases flow from the combustion section through a hot gas path defined within the turbine section and then exit the turbine section via the exhaust section.

In particular configurations, the turbine section includes, in serial flow order, a high pressure (HP) turbine and a low pressure (LP) turbine. The HP turbine and the LP turbine each include various stationary turbine components (e.g., stator vanes or nozzles, turbine shrouds, shroud supports, etc.) that at least partially define the hot gas path through the turbine section. These stationary components are typically constructed from materials capable of withstanding prolonged exposure to the hot gasses (e.g., ceramic matrix composite). Nevertheless, the stationary components positioned radially outward from the hot gas path (e.g., casing) may have less favorable thermal properties. In this respect, leaf seals may be disposed between adjacent stationary components along the hot gas path to prevent hot exhaust gases from flowing therebetween.

Conventional leaf sealing arrangements may use checkmark springs to push the leaf seals against the sealing surfaces on the adjacent stationary components. However, checkmark springs may experience material fatigue. Accordingly, a sealing assembly for adjacent stationary components of a gas turbine engine that experiences reduced fatigue would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a gas turbine sealing assembly. The gas turbine sealing assembly includes a first static gas turbine wall and a second static gas turbine wall. The gas turbine sealing assembly includes a leaf seal having a first side and a second side. The first static gas turbine wall contacts the second side of the leaf seal at a first position, and the second static gas turbine wall contacts the second side of the leaf seal at a second position. The gas turbine sealing assembly includes a spring for exerting axial force on the first side of the leaf seal. The spring includes a first spring wall coupled to the first static gas turbine wall. A second spring wall extends radially outward from the first spring wall. A third spring wall extends axially away from the second spring wall. A fourth spring wall extending radially inward from the third spring wall and includes a radially inner end. The radially inner end of the fourth spring contacts the first side of the leaf seal between the first position and the second position.

In a further aspect, the present disclosure is directed to a gas turbine. The gas turbine includes a compressor, a combustion section, and a turbine having a first static wall and a second static wall. The gas turbine includes a leaf seal having a first side and a second side. The first static wall contacts the second side of the leaf seal at a first position, and the second static wall contacts the second side of the leaf seal at a second position. A spring exerts axial force on the first side of the leaf seal. The spring includes a first spring wall coupled to the first turbine wall. A second spring wall extends radially outward from the first spring wall. A third spring wall extends axially away from the second spring wall. A fourth spring extends radially inward from the third spring wall. The fourth spring includes a radially inner end. The radially inner end of the fourth spring contacts the first side of the leaf seal between the first position and the second position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of a turbine shroud incorporated into a turbofan jet engine for purposes of illustration, one of ordinary skill in the art will readily appreciate that embodiments of the present invention may be applied to any turbine incorporated into any turbomachine and are not limited to a gas turbofan jet engine unless specifically recited in the claims.

Figure 1:
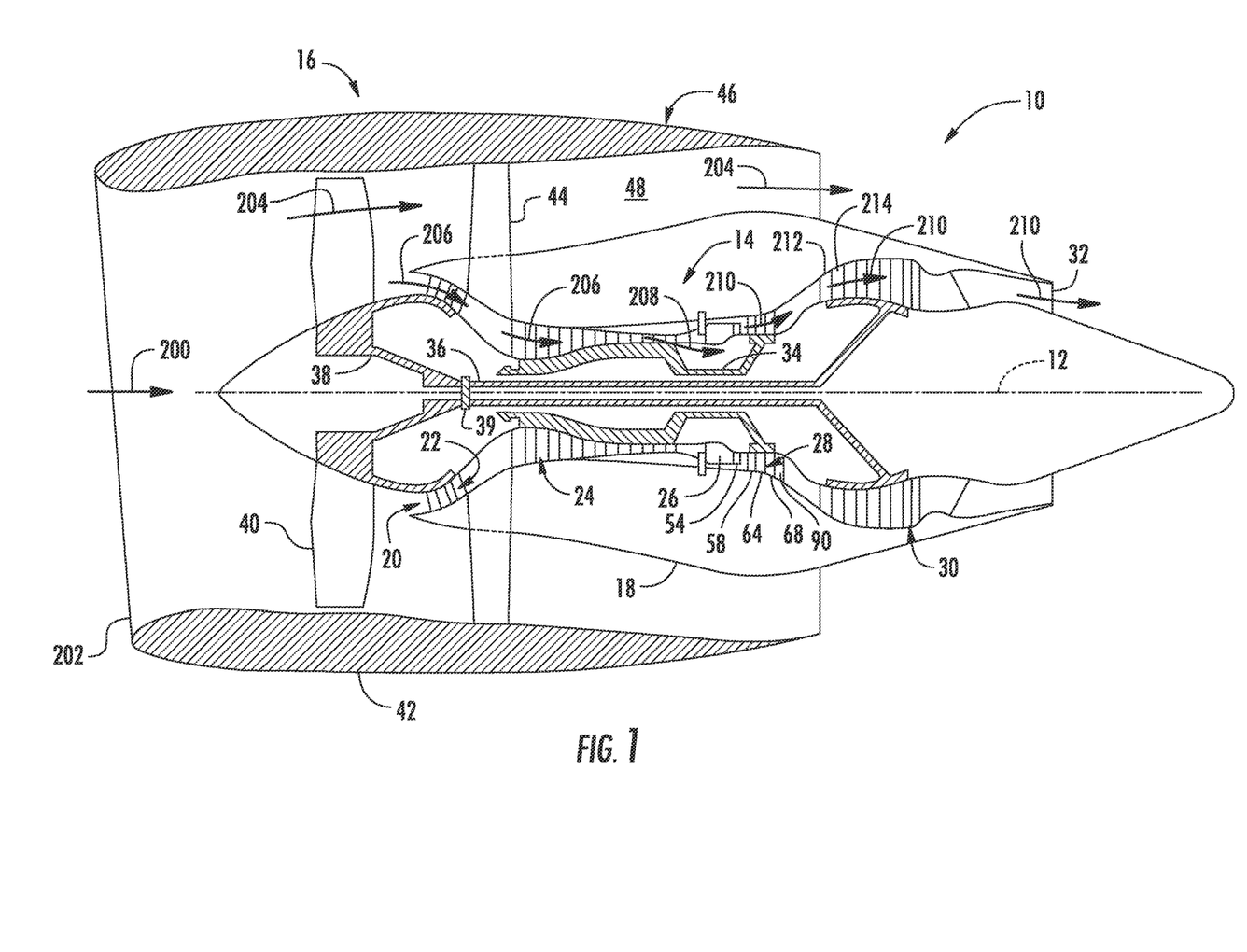
FIG. 1 is a schematic cross-sectional view of an exemplary high bypass turbofan jet engine in accordance with the embodiments disclosed herein.

Referring now to the drawings, wherein identical numerals indicate the same elements throughout the figures, FIG. 1 is a schematic cross-sectional view of an exemplary high bypass turbofan type gas turbine engine 10 herein referred to as "turbofan 10" as may incorporate various embodiments of the present invention. As shown in FIG. 1, the turbofan 10 has a longitudinal or axial centerline axis 12 extending therethrough for reference purposes. In general, the turbofan 10 may include a core turbine or gas turbine engine 14 disposed downstream from a fan section 16.

The gas turbine engine 14 may generally include a substantially tubular outer casing 18 that defines an annular inlet 20. The outer casing 18 may be formed from multiple casings. The outer casing 18 encases, in serial flow relationship, a compressor section having a booster or low pressure (LP) compressor 22 and a high pressure (HP) compressor 24, a combustion section 26, a turbine section having a high pressure (HP) turbine 28 and a low pressure (LP) turbine 30, and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The LP spool 36 may also connect to a fan spool or shaft 38 of the fan section 16. In particular embodiments, as shown in FIG. 1, the LP spool 36 may connect directly to the fan spool 38, such as in a direct-drive configuration. In alternative configurations, the LP spool 36 may connect to the fan spool 38 via a reduction gear 39, such as in an indirect-drive or geared-drive configuration.

As shown in FIG. 1, the fan section 16 includes a plurality of fan blades 40 coupled to and extending radially outwardly from the fan spool 38. An annular fan casing or nacelle 42 circumferentially surrounds the fan section 16 and/or at least a portion of the gas turbine engine 14. It should be appreciated by those of ordinary skill in the art that the nacelle 42 may be configured to be supported relative to the gas turbine engine 14 by a plurality of circumferentially-spaced outlet guide vanes 44. Moreover, a downstream section 46 of the nacelle 42 may extend over an outer portion of the gas turbine engine 14 to define a bypass airflow passage 48 therebetween.

Figure 2:
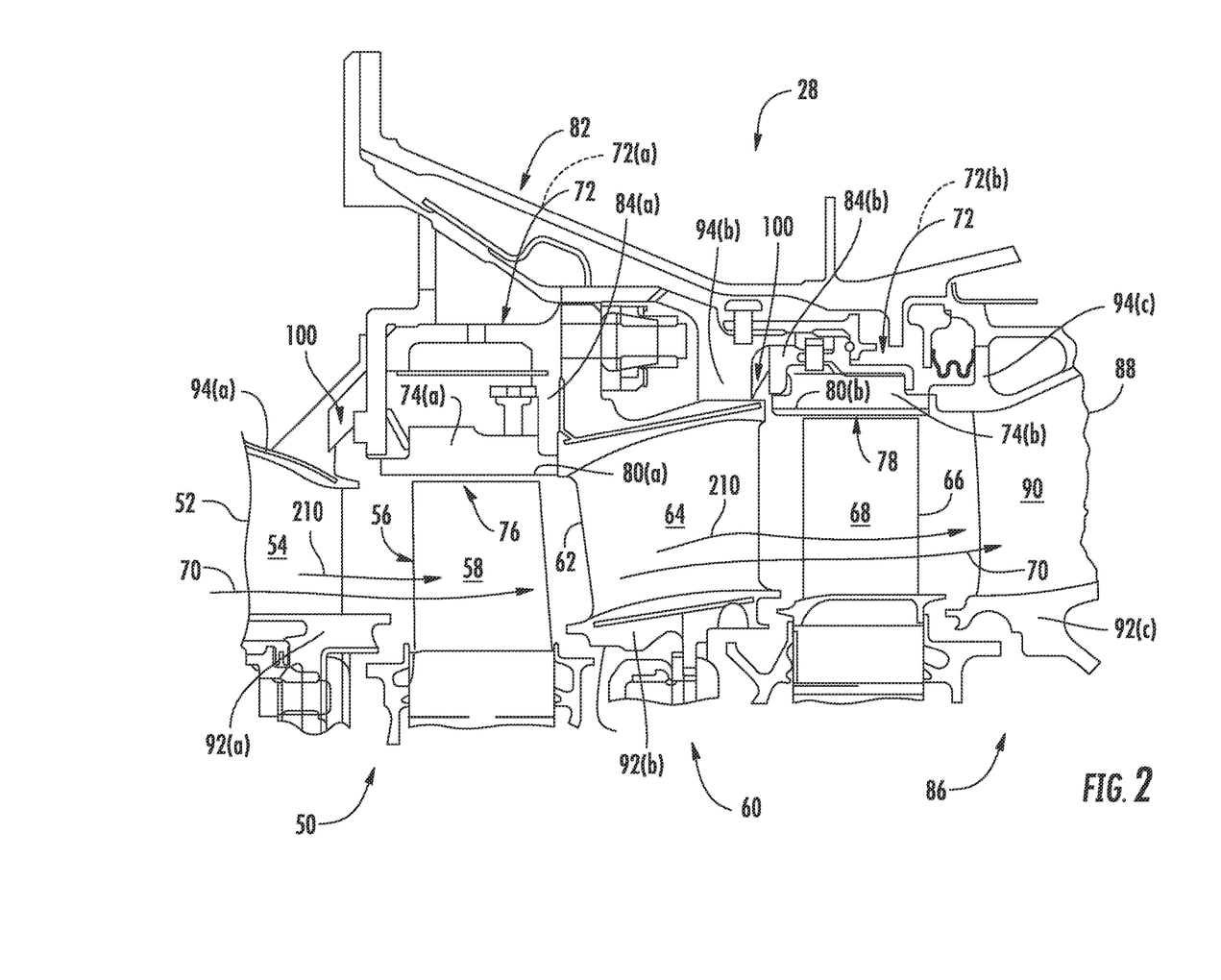
FIG. 2 is an enlarged cross sectional side view of a high pressure turbine portion of the gas turbine engine shown in FIG. 1, illustrating the location of a sealing assembly in a high pressure (HP) turbine.

FIG. 2 is an enlarged cross-sectional view of the HP turbine 28 portion of the gas turbine engine 14 as shown in FIG. 1, which may incorporate various embodiments disclosed herein. As shown in FIG. 2, the HP turbine 28 includes, in serial flow relationship, a first stage 50 having a row 52 of one or more stator vanes 54 (only one shown) axially spaced apart from a row 56 of one or more turbine rotor blades 58 (only one shown). The HP turbine 28 further includes a second stage 60 having a row 62 of one or more stator vanes 64 (only one shown) axially spaced apart from a row 66 of one or more turbine rotor blades 68 (only one shown). The HP turbine 28 may include a third stage 86 having a row 88 of one or more stator vanes 90 (only one shown). Although not shown in FIG. 2, the third stage 86 may also include a row of turbine rotor blades.

The turbine rotor blades 58, 68 extend radially outwardly from and are coupled to the HP spool 34 (FIG. 1). As shown in FIG. 2, the stator vanes 54, 64, 90 and the turbine rotor blades 58, 68 at least partially define a hot gas path 70 for routing combustion gases from the combustion section 26 (FIG. 1) through the HP turbine 28. As shown in FIG. 1, the rows 52, 62, 88 of the stator vanes 54, 64, 90 are annularly arranged about the HP spool 34 and the rows 56, 66 of the turbine rotor blades 58, 68 are circumferentially spaced around the HP spool 34. The stator vanes 54, 64, 90 respectively mount to the HP turbine 28 via a radially inner stator vane mount 92a, 92b, 92c and a radially outer stator vane mount 94a, 94b, 94c or any other suitable hardware components.

As shown in FIG. 2, various embodiments of the HP turbine 28 include at least one turbine shroud assembly 72. For example, the HP turbine 28 may include a first turbine shroud assembly 72(a) and a second turbine shroud assembly 72(b). Each turbine shroud assembly 72(a), 72(b) generally forms a ring or shroud around the corresponding row 56, 66 of turbine rotor blades 58, 68. Each turbine shroud assembly 72(a), 72(b) includes a turbine shroud or shroud seal 74(a), 74(b) radially spaced from blade tips 76, 78 of the turbine rotor blades 58, 68. This arrangement forms clearance gaps between the blade tips 76, 78 and sealing surfaces or hot side surfaces 80(a), 80(b). It is generally desirable to minimize the clearance gap between the blade tips 76, 78 and the turbine shrouds 74(a), 74(b), particularly during cruise operation of the turbofan 10, to reduce leakage from the hot gas path 70 over the blade tips 76, 78 and through the clearance gaps.

In particular embodiments, at least one of the turbine shrouds 74(a), 74(b) may be formed as a continuous, unitary or seamless ring. Each turbine shroud assembly 72(a), 72(b) may be connected to a static structure such as a backbone or casing 82 of the gas turbine engine 14 via a shroud assembly mount 84(a), 84(b) or other suitable hardware components.

As illustrated in FIG. 1, air 200 enters an inlet portion 202 of the turbofan 10 during operation thereof. A first portion of the air 200 indicated by arrow 204 flows into the bypass flow passage 48, and a second portion of the air 200 indicated by arrow 206 enters the inlet 20 of the LP compressor 22. The LP compressor 22 progressively compresses the second portion of air 206 flowing therethrough en route to the HP compressor 24. The HP compressor 24 further compresses the second portion of the air 206 flowing therethrough 24, thus providing compressed air indicated by arrow 208 to the combustion section 26 where it mixes with fuel and burns to provide combustion gases indicated by arrow 210.

The combustion gases 210 flow through the HP turbine 28 where the stator vanes 54, 64, 90 and turbine rotor blades 58, 68 extract a first portion of kinetic and/or thermal energy from the combustion gases 210. This energy extraction supports operation of the HP compressor 24. The combustion gases 210 then flow through the LP turbine 30 where sequential stages of LP turbine stator vanes 212 and LP turbine rotor blades 214 coupled to the LP shaft or spool 36 extract a second portion of thermal and kinetic energy from the combustion gases 210. This energy extraction causes the LP shaft or spool 36 to rotate, thereby supporting operation of the LP compressor 22 and/or rotation of the fan spool or shaft 38. The combustion gases 210 then flow through the jet exhaust nozzle section 32 of the gas turbine engine 14.

Along with a turbofan 10, a core turbine 14 serves a similar purpose and sees a similar environment in land-based gas turbines, turbojet engines in which the ratio of the first portion of air 204 to the second portion of air 206 is less than that of a turbofan, and unducted fan engines in which the fan section 16 is devoid of the nacelle 42. In each of the turbofan, turbojet, and unducted engines, a speed reduction device (e.g., the reduction gearbox 39) may be included between any shafts and spools. For example, the reduction gearbox 39 may be disposed between the LP spool 36 and the fan shaft 38 of the fan section 16.

The temperature of the combustion gases 210 flowing through the HP and LP turbine sections 28, 30, and particularly through the HP turbine 28, may be extreme. For example, the combustion gases 210 flowing through the hot gas path 70 defined by/within the HP turbine 28 may exceed 2000 degrees Fahrenheit. In this respect, the components disposed along the hot gas path 70 (e.g., stator vanes 54, 64, 90; turbine rotor vanes 58, 68; turbine shroud assemblies 72a, 72b; etc.) are typically constructed from a metal, a ceramic matrix composite (CMC), or any other material capable of withstanding prolonged exposure to the hot gasses.

Nevertheless, the components positioned radially outward from the hot gas path 70 (e.g., the casing 82) may have less favorable thermal properties. In this respect, a sealing assembly 100 may be disposed between adjacent stationary components along the hot gas path 70 to prevent hot exhaust gases from flowing therebetween. In the embodiment shown in FIG. 2, for example, the sealing assembly 100 is positioned between the shroud assembly mount 84(*b*) and the radially inner stator vane mount 94(*b*). Although, the sealing assembly 100 may be disposed between any adjacent stationary components in the HP turbine 28, the LP turbine 30, or anywhere else in the gas turbine engine 10. The sealing assembly 100 preferably extends around the entire circumference of the HP turbine 28 or LP turbine 30.

Figure 3:
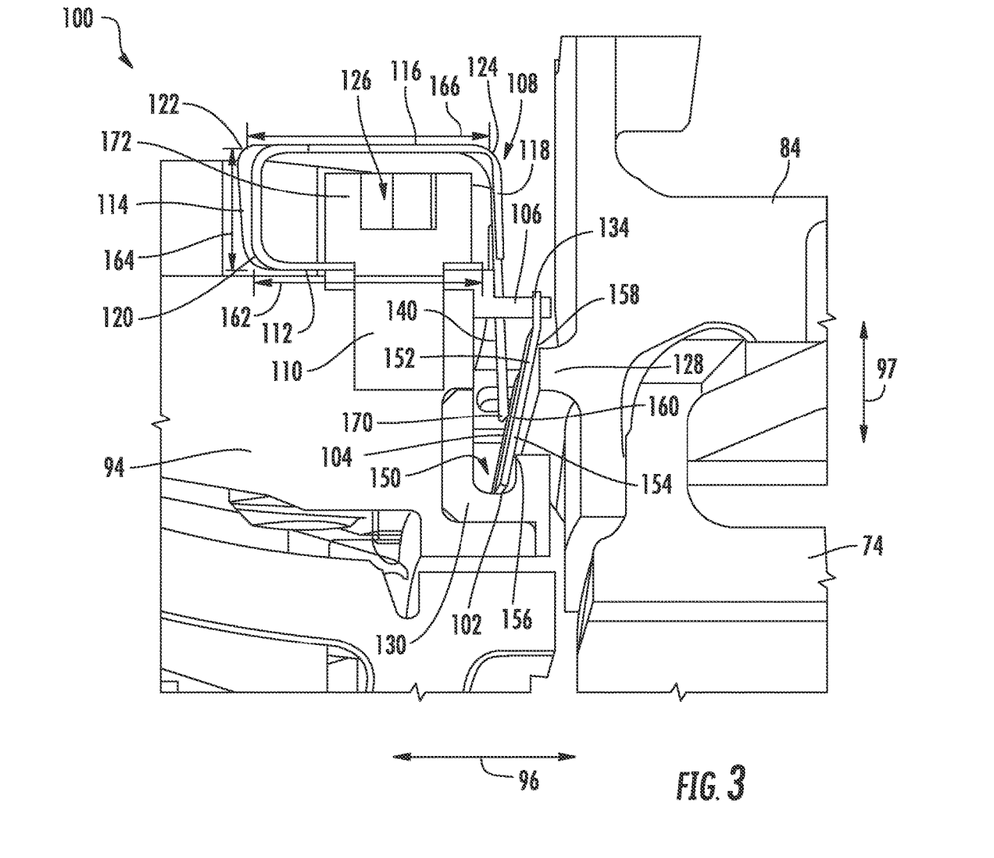
FIG. 3 is a cross-sectional view of the sealing assembly, illustrating a leaf seal, a retainer, and a spring.
Figure 4:
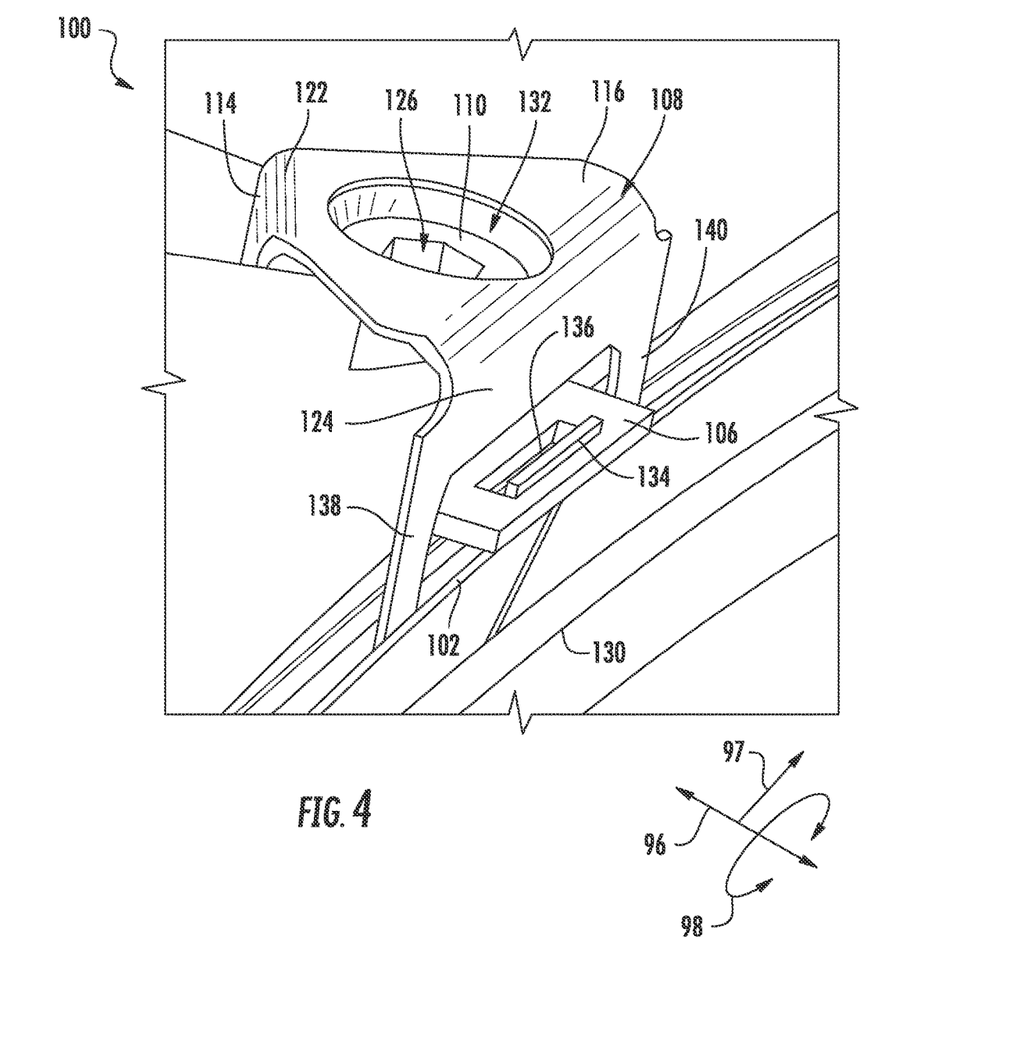
FIG. 4 is a perspective view of the sealing assembly, further illustrating the features of the leaf seal, the retainer, and the spring.
Figure 5:
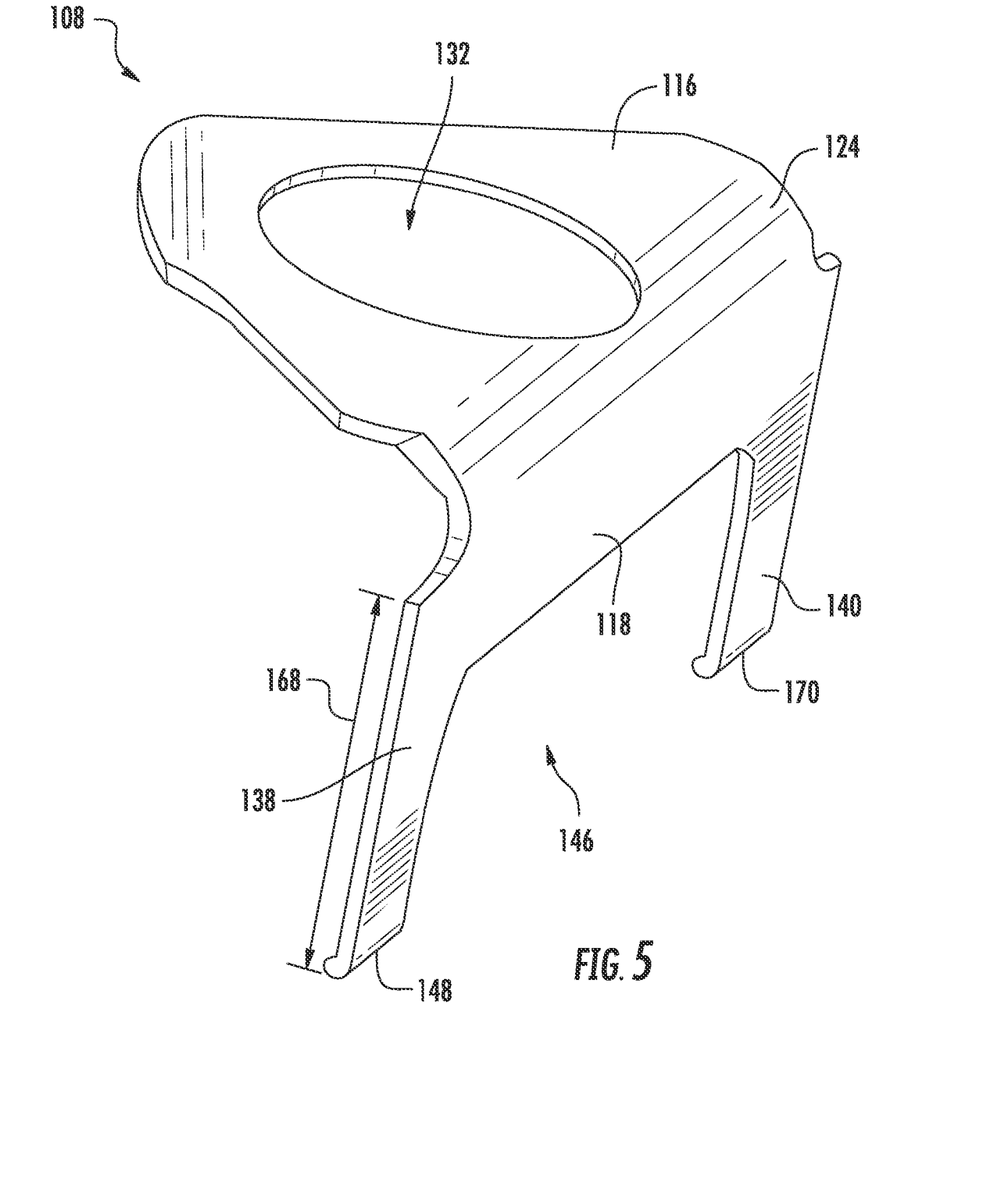
FIG. 5 is a perspective view of the spring in accordance with the embodiments disclosed herein.
Figure 6:
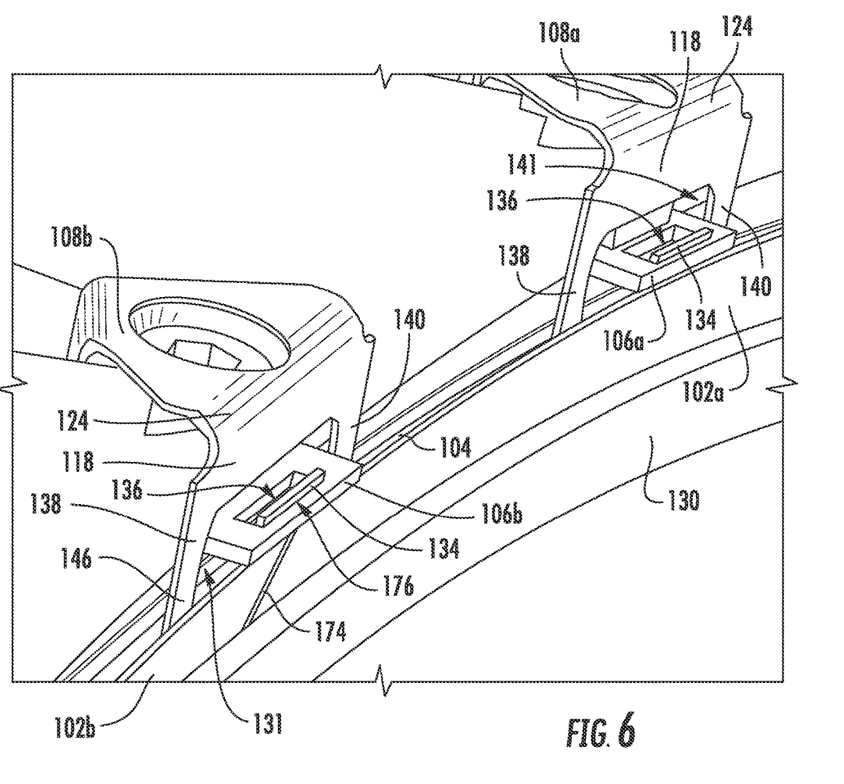
FIG. 6 is a perspective view of the sealing assembly, illustrating a first spring, a second spring, a first leaf seal, and a second leaf seal.

FIGS. 3-6 illustrate various features on the sealing assembly 100. In particular, FIG. 3 is a cross-sectional view of the sealing assembly 100, illustrating a leaf seal 102, a retainer 106, and a spring 108. FIG. 4 is a perspective view of the sealing assembly 100, further illustrating the features of the leaf seal 102, the retainer 106, and the spring 108. FIG. 5 is a perspective view of the spring 108 in accordance with the embodiments disclosed herein. FIG. 6 is a perspective view of two adjacent sealing assemblies 100, illustrating a first spring 108a, a second spring 108b, a first leaf seal 106a, and a second leaf seal 106b.

As illustrated in FIGS. 3, 4, and 6, the sealing assembly 100 defines an axial direction 96, a radial direction 97, and a circumferential direction 98. In general, the axial direction 96 extends along the longitudinal axis 12, the radial direction 97 extends orthogonally outward from the longitudinal axis 12, and the circumferential direction 98 extends concentrically around the longitudinal axis 12.

FIGS. 3, 4, and 6 include an exemplary shroud assembly mount 84, which may refer to any shroud assembly mount in the turbofan 10, and an exemplary radially inner stator vane mount 94, which may refer to any radially inner stator vane mount in the turbofan 10.

With respect to FIGS. 3 and 4, the sealing assembly 100 includes a leaf seal 102, which spans the space between the shroud assembly mount 84 and the radially inner stator vane mount 94. More specifically, the leaf seal 102 is generally flat and includes a first side 152 and a second side 154. A slot 150 in the radially inner stator vane mount 94 receives the leaf seal 102. In some embodiments, the slot 150 may be formed in an insert 130 that attaches to the radially inner stator vane mount 94. The leaf seal 102 contacts the radially inner stator vane mount 94 or the insert 130 at a first position 156. The other end of the leaf seal 102 is positioned against a shroud assembly mount boss 128, which extends axially outward from the shroud assembly mount 84. In this respect, the leaf seal 102 contacts the shroud assembly mount 84 at a second position 158. The shroud assembly mount 84 and the radially inner stator vane mount 94 or the insert 130 contact the leaf seal on the same side thereof, namely the second side 154. The spring 108 exerts force on the first side 152 of the leaf spring 102 at a third position 160, which is located radially between the first position 156 and the second position 158. As such, the spring 108 holds the leaf seal 102 against the shroud assembly mount 84 and the radially inner stator vane mount 94.

The sealing assembly 100 may include a backer seal 104. The backer seal 104 is a generally flat seal that may be positioned against the first side 152 of leaf seal 102. In this respect, the spring 108 may exert force on the backer seal 104, which in turn exerts force on the first side 152 of leaf seal 102. The backer seal 104 may also include a backer seal boss 176, which extends radially outward therefrom. As will be discussed in greater detail below, the backer seal 104 may span the gap between adjacent leaf seals 102 (FIG. 6).

The sealing assembly 100 may further include the retainer 106, which prevents radially outward movement of the leaf seal 102. The retainer 106 attaches to the radially inner stator vane mount 94 via, e.g., a fastener 110. The retainer 106 extends axially outward into the gap between the shroud assembly mount 84 and the radially inner stator vane mount 94 and defines a retainer aperture 136 (FIG. 4). A leaf seal boss 134, which extends radially outward from the leaf seal 102, fits into the retainer aperture 136. In this respect, the engagement between the leaf seal boss 134 and the retainer aperture 136 prevent relative radial and circumferential movement between the leaf seal 102 and the retainer 106.

The spring 108 includes a first wall 112, a second wall 114, a third wall 116, and a fourth wall 118. The first wall 112 is substantially parallel to the retainer 106 and connects to the radially inner stator vane mount 94 via, e.g., the fastener 110. The second wall 114 extends radially outward from the first wall 112. A first bend 120 connects the first wall 112 and the second wall 114. The third wall 116 extends axially outward from the second wall 114. A second bend 122 connects the second wall 114 and the third wall 116. The fourth wall 118 extends radially inward from the third wall 116, which contacts the leaf seal 102. A third bend 124 connects the third wall 116 and the fourth wall 118. In this respect, the first wall 112 and the third wall 116 are substantially parallel and radially spaced apart. The second wall 114 and the fourth wall 118 are axially spaced apart and may be substantially parallel or angularly oriented with respect to each other as illustrated in FIG. 4. In one embodiment, the first wall 112, the second wall 114, the third wall 116, and the fourth wall 118 extend in a linear manner (i.e., each is straight) as illustrated in FIG. 3. Nevertheless, the first wall 112, the second wall 114, the third wall 116, and the fourth wall 118 may be curved or extend in an otherwise non-linear manner. Preferably, the first wall 112, the second wall 114, the third wall 116, and the fourth wall 118 are integrally connected. The first wall 112 should not be connected to the fourth wall 118.

The first, second, third, and fourth walls 112, 114, 116, 118 respectively include a first wall length 162, a second wall length 164, a third wall length 166, and a fourth wall length 168 (FIG. 5). The fourth wall length 168 is relatively greater than the second wall length 164 so that fourth wall 118 can extend radially inward into the gap between the shroud assembly mount 84 and the radially inner stator vane mount 94 to contact the leaf seal 102, while the remainder of the spring 108 (i.e., the first, second, and third walls 112, 114, 116) is positioned radially outward from the leaf seal 102. The third wall length 166 is relatively greater than the first wall length 162 to permit the fourth wall length 168 to be relatively greater than the second wall length 164. In this respect, the fourth wall 118 is positioned axially outward from the first wall 112 to create clearance so that the fourth wall 118 to extend radially inwardly past the fourth wall 118.

In some embodiments, the fastener 110 mates the first wall 112 to the retainer 106, and the retainer 106 couples to the radially inner stator vane mount 94. In this respect, the fastener 110 indirectly couples the first wall 112 to the radially inner stator vane mount 94. In alternate embodiments, the fastener 110 may directly couple the first wall 112 to the radially inner stator vane mount 94. The third wall 116 may include a third wall aperture 132 (FIG. 4) to provide clearance to install the fastener 110 into the first wall 112. Preferably, a head 172 of the fastener 110 may be radially positioned between the first wall 112 and the third wall 116. The fastener 110 is preferably a threaded fastener (e.g., bolt, screw, etc.) and may include a fastener cavity 126 to permit a tool (not shown) to engage or otherwise rotate the fastener 110. Although, the fastener 110 may be any suitable fastener (e.g., rivet, weld, etc.).

FIGS. 4 and 5 further illustrate the features of the spring 108. Note that the first wall 112 and the second wall 114 are omitted in FIG. 5 for clarity. For example, the fourth wall 118 includes a first arm 138 and a second arm 140 that define a fourth wall notch 146 therebetween. The first and second arms 138, 140 respectively extend radially inward to a first arm tip 148 and a second arm tip 170. The tips 148, 170 contact the first side 152 of the leaf seal 102 and exert force thereon. The notch 146 provides axial clearance for the retainer 106. That is, the fourth wall notch 146 permits the retainer 106 to extend axially outward from the radially inner stator vane mount 94 to engage the leaf seal boss 134.

In one embodiment, the third wall 116 may be relatively narrower than the fourth wall 118 in the circumferential direction 98. Furthermore, the third wall 116 may narrow in the axial direction from the third bend 124 to the second bend 122. As such, the third wall 116 is circumferentially wider at the third bend 124 than at the second bend 122.

The leaf seal 102, the backer seal 104, the retainer 106, and/or the spring 108 are preferably constructed from a suitable nickel or cobalt alloys. Suitable nickel and cobalt alloys include Rene 41® Alloy produced by General Electric Co. of Schenectady, N.Y., USA; HAYNES® alloy 188 produced by Haynes International of Kokomo, Ind., USA; and UDIMET® alloy L-605 produced by Special Metal Corporation of New Hartford, N.Y., USA. Other suitable materials may be used as well.

To install the sealing assembly 100 in the turbofan 10, the leaf seal 102 is placed into the slot 150 in the radially inner stator vane mount 94 or the insert 130. In this position, the leaf seal 102 leans against the shroud assembly mount boss 128 at the second position 158 and the radially inner stator vane mount 94 or insert 130 at the first position 156. The backer seal 104 may or may not be positioned against the first side 152 of the leaf seal 102 as will be discussed in greater detail below. The retainer 106 is placed on the radially inner stator vane mount 94 such that the retainer 106 extends outwardly into the space between the shroud assembly mount 84 and the radially inner stator vane mount 94. The retainer 106 should be positioned so that the leaf seal boss 134 extends through the retainer aperture 136. The first wall 112 of the spring 108 is placed on top of the retainer 106. In this respect, the fourth wall 118 extends radially inward and contacts the leaf seal 102 or the backer seal 104 at the third position 160 to exert force thereon. The fastener 110 installs through the third wall aperture 132 and may simultaneously secure the first wall 112 and the retainer 106 to the radially inner stator vane mount 94.

When the leaf seal 102 expands and contracts (e.g., due to thermal expansion) or is jarred (e.g., due air turbulence), the spring 108 must deflect to accommodate these changes. In particular, the tips 148, 170 of the fourth wall 118 are moveable axially relative to the third bend 124, third bend 124 is moveable radially relative to the second bend 122, and the second bend 122 is moveable axially relative to the first bend 120. Unlike conventional sealing arrangements, this deflection is distributed over three bends (i.e., the first bend 120, the second bend 122, and the third bend 124) and multiple walls (i.e., at least the second wall 114, the third wall 116, and the fourth wall 118). This reduces the maximum amount of stress that the spring 108 experiences, thereby lengthening the service life thereof.

Furthermore, the first wall 112, the second wall 114, and the third wall 116 are positioned radially outward from the leaf seal 102. As mentioned above, the fourth spring wall 118 extends radially inward from the third wall 116 to contact the leaf seal 102. In this respect, the first, second, and third walls 112, 114, 116 and the bends 120, 122, 124 experience relatively lower temperatures than portions of the fourth wall 118, particularly the tips 148, 170. As such, the bends 120, 122, 124 experience lower levels of fatigue, and accordingly have a longer service life than conventional springs, which are positioned near the seals, used in conventional leaf sealing arrangements.

FIG. 6 is a perspective view the sealing assembly 100 including two adjacent springs and two adjacent leaf seals. More specifically, the sealing assembly 100 includes a first leaf seal 102a and a second leaf seal 102b. Both of the leaf seals 102a, 102b are placed in the slot 130 so that the seals 102a, 102b are circumferentially spaced apart to create a gap 174 between the leaf seals 102a, 102b to accommodate thermal expansion thereof. The backer seal 104 is positioned in contact with the first sides 152 of the leaf seals 102a, 102b to bridge the gap 174.

A first retainer 106a engages the first leaf seal 108a, and a second retainer 106b engages the backer seal 104. More specifically, the leaf seal boss 134 of the first leaf seal 102a extends through the retainer aperture 136 of first retainer 106a. In a similar manner, the backer seal boss 176 of the backer seal 104 extends through the retainer aperture 136 of the second retainer 106b. In this respect, the first retainer 106a prevents relative radial and circumferential movement between the first leaf seal 102a and the first retainer 106a. Similarly, the second retainer 106b prevents relative radial and circumferential movement between the backer seal 104 and the second retainer 106b. A third retainer (not shown) also engages the leaf seal boss (not shown) on the second leaf seal 102b. The first and second retainers 106a, 106b are substantially similar to the retainer 106 and couple to the radially inner stator vane mount 94 as discussed above.

A first spring 108a exerts force on the first leaf seal 102a, and a second spring 108b exerts force on the backer seal 104. More specifically, the tips 148, 170 of the arms 138, 140 of the first spring 108a contact the first side 152 of the first leaf seal 102a and exert pressure thereon. Similarly, the tips 148, 170 of the arms 138, 140 of the second spring 108b contact backer seal 104 and exert pressure thereon. The backer seal 104, in turn, exerts force on the first and second leaf seals 102a, 102b. A third spring (not shown) contacts the first side 152 of the second leaf seal 102b. The first and second retainers 106a, 106b respectively extend through the notches 146 in the first and second springs 108a, 108b. The first and second springs 108a, 108b are substantially similar to the spring 108 and couple to the radially inner stator vane mount 94 as discussed above.

In one embodiment, one or more leaf seals 102 extend circumferentially around the entire HP turbine 28 or LP turbine 30. That is, the one or more leaf seals 102 and one or more backer seals 104 form a continuous circle around the HP turbine 28 or LP turbine 30. While only two leaf seals 102a, 102b, two retainers 106a, 106b, and two springs 108a, 108b are illustrated in FIG. 6, the sealing assembly 100 may include more or less leaf seals, retainers, and springs as is needed or desired.

Furthermore, the adjacent springs 108 in the sealing assembly 100 preferably alternate between contacting the leaf seals 102 and the backer seals 104. That is, the first spring 108a contacts the first leaf seal 102a, the second spring 108b contacts the backer seal 104, the third spring (not shown) contacts the second leaf seal 102b, a fourth spring (not shown) contacts a second backer seal (not shown), etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine sealing assembly, comprising:
    a first static gas turbine wall;
    a second static gas turbine wall;
    a leaf seal comprising a first side and a second side, wherein the first static gas turbine wall contacts the second side of the leaf seal at a first position and the second static gas turbine wall contacts the second side of the leaf seal at a second position; and
    a spring for exerting axial force on the first side of the leaf seal, the spring comprising:
        a first spring wall coupled to the first static gas turbine wall;
        a second spring wall extending radially outward from the first spring wall;
        a third spring wall extending axially away from the second spring wall; and
        a fourth spring wall extending radially inward from the third spring wall, wherein the fourth spring wall comprises a radially inner end, and wherein the radially inner end of the fourth spring wall contacts the first side of the leaf seal between the first position and the second position.

2. The gas turbine sealing assembly of claim 1, wherein the first static gas turbine wall comprises a stator vane assembly mount and the second gas static gas turbine wall comprises a turbine shroud assembly mount.

3. The gas turbine sealing assembly of claim 1, further comprising:
    a fastener for coupling the first static gas turbine wall and the first spring wall, wherein the third spring wall defines an aperture that provides clearance to install the fastener.

4. The gas turbine sealing assembly of claim 1, wherein the first spring wall is integrally connected to the second spring wall, the second spring wall is integrally connected to the third spring wall, and the third spring wall is integrally connected to the fourth spring wall.

5. The gas turbine sealing assembly of claim 1, wherein the radial inner end of the fourth spring wall is moveable axially relative to a third bend, the third bend is moveable radially relative to a second bend, and the second bend is moveable axially relative to a first bend.

6. The gas turbine sealing assembly of claim 1, wherein the fourth spring wall is radially longer than the second spring wall, and wherein the third spring wall is axially longer than the first spring wall.

7. The gas turbine sealing assembly of claim 1, wherein the leaf seal comprises a first leaf seal and a second leaf seal circumferentially spaced apart from the first leaf seal.

8. The gas turbine sealing assembly of claim 7, wherein the spring comprises a first spring and a second spring, and wherein the fourth spring wall of the first spring contacts the first side of the first leaf seal or the second leaf seal and the fourth spring wall of the second spring contacts a backer seal.

9. The gas turbine sealing assembly of claim 1, wherein the fourth spring wall comprises a first arm and a second arm parallel to the first arm.

10. The gas turbine sealing assembly of claim 1, further comprising:
    a retainer coupled to the first static gas turbine wall and to the leaf seal to prevent circumferential movement of the leaf seal.

11. A gas turbine, comprising:
    a compressor;
    a combustion section;
    a turbine comprising:
        a first static wall; and
        a second static wall; and
    a leaf seal comprising a first side and a second side, wherein the first static wall contacts the second side of the leaf seal at a first position and the second static wall contacts the second side of the leaf seal at a second position; and
    a spring for exerting axial force on the first side of the leaf seal, the spring comprising:
        a first spring wall coupled to the first turbine wall;
        a second spring wall extending radially outward from the first spring wall;
        a third spring wall extending axially away from the second spring wall; and
        a fourth spring wall extending radially inward from the third spring wall, wherein the fourth spring wall comprises a radially inner end, and wherein the radially inner end of the fourth spring wall contacts the first side of the leaf seal between the first position and the second position.

12. The gas turbine of claim 11, further comprising:
a fastener for coupling the first static wall and the first spring wall, wherein the third spring wall defines an aperture that provides clearance to install the fastener.

13. The gas turbine of claim 11, wherein the first spring wall is integrally connected to the second spring wall, the second spring wall is integrally connected to the third spring wall, and the third spring wall is integrally connected to the fourth spring wall.

14. The gas turbine of claim 11, wherein the radial inner end of the fourth spring wall is moveable axially relative to a third bend, the third bend is moveable radially relative to a second bend, and the second bend is moveable axially relative to a first bend.

15. The gas turbine of claim 11, wherein the fourth spring wall is radially longer than the second spring wall, and wherein the third spring wall is axially longer than the first spring wall.

16. The gas turbine of claim 11, wherein the leaf seal comprises a first leaf seal and a second leaf seal circumferentially spaced apart from the first leaf seal.

17. The gas turbine of claim 16, further comprising:
a backer seal in contact with the first leaf seal and the second leaf seal.

18. The gas turbine of claim 17, wherein the spring comprises a first spring and a second spring, and wherein the fourth spring wall of the first spring contacts the first side of the first leaf seal or the second leaf seal and the fourth spring wall of the second spring contacts the backer seal.

19. The gas turbine of claim 11, further comprising:
a retainer coupled to the first static gas turbine wall and to the leaf seal to prevent circumferential movement of the leaf seal.

20. The gas turbine of claim 11, further comprising:
a reduction gear positioned between a low pressure spool and a fan spool.

* * * * *